United States Patent
van Diggelen

(10) Patent No.: US 12,140,686 B2
(45) Date of Patent: Nov. 12, 2024

(54) DETERMINING VELOCITY USING A REFLECTED POSITIONING SIGNAL

(71) Applicant: Google LLC, Mountain View, CA (US)

(72) Inventor: Frank van Diggelen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 114 days.

(21) Appl. No.: 17/297,918

(22) PCT Filed: Mar. 1, 2019

(86) PCT No.: PCT/US2019/020296
§ 371 (c)(1),
(2) Date: May 27, 2021

(87) PCT Pub. No.: WO2020/180282
PCT Pub. Date: Sep. 10, 2020

(65) Prior Publication Data
US 2022/0043166 A1    Feb. 10, 2022

(51) Int. Cl.
*G01S 19/52*    (2010.01)
*G01S 19/42*    (2010.01)

(52) U.S. Cl.
CPC .......... *G01S 19/52* (2013.01); *G01S 19/428* (2013.01)

(58) Field of Classification Search
CPC ........ G01S 19/52; G01S 19/428; G01S 19/22; G01S 19/246
See application file for complete search history.

(56) References Cited

U.S. PATENT DOCUMENTS

| | | |
|---|---|---|
| 6,417,801 B1 | 7/2002 | Van Diggelen et al. |
| 6,542,820 B2 | 4/2003 | LaMance et al. |
| 6,560,534 B2 | 5/2003 | Abraham et al. |
| 6,590,530 B2 | 7/2003 | Van Diggelen et al. |
| 6,819,707 B2 | 11/2004 | Abraham et al. |
| 6,829,534 B2 | 12/2004 | Fuchs et al. |
| 6,958,726 B1 | 10/2005 | Abraham et al. |
| 6,965,760 B1 * | 11/2005 | Chen ...................... G01S 19/06 455/67.11 |
| 6,975,266 B2 | 12/2005 | Abraham et al. |
| 7,158,080 B2 | 1/2007 | Van Diggelen |

(Continued)

OTHER PUBLICATIONS

International Search Report for corresponding PCT application No. PCT/US2019/020296, dated Nov. 11, 2019.

(Continued)

*Primary Examiner* — Timothy A Brainard
*Assistant Examiner* — Kenneth W Good
(74) *Attorney, Agent, or Firm* — McDonnell Boehnen Hulbert & Berghoff LLP

(57) ABSTRACT

Examples for determining velocity using a reflected positioning signal are presented herein. An example may involve a receiver receiving signals from satellites and identifying a particular signal that reflected off a reflecting plane prior to reaching the receiver. The receiver may then determine a reflected satellite position for a satellite that transmitted the particular signal. The reflected satellite position may be determined by reflecting a position of the satellite about the reflecting plane. The receiver may then determine a direction vector to the reflected satellite position for the satellite and determine its velocity using the determined direction vector.

20 Claims, 10 Drawing Sheets

(56) References Cited

U.S. PATENT DOCUMENTS

| | | |
|---|---|---|
| 7,158,882 B2 | 1/2007 | Abraham et al. |
| 7,245,253 B2 | 7/2007 | van Diggelen et al. |
| 7,253,768 B2 | 8/2007 | Van Diggelen et al. |
| 7,256,732 B2 | 8/2007 | De Salas et al. |
| 7,489,269 B2 | 2/2009 | Van Diggelen et al. |
| 7,548,816 B2 | 6/2009 | Riben et al. |
| 7,924,947 B2 | 4/2011 | Tapucu et al. |
| 7,940,214 B2 | 5/2011 | Van Diggelen et al. |
| 7,987,048 B2 | 7/2011 | Van Diggelen |
| 8,009,092 B2 | 8/2011 | Abraham et al. |
| 8,032,301 B2 | 10/2011 | Van Diggelen et al. |
| 8,134,500 B2 | 3/2012 | Van Diggelen et al. |
| 8,164,518 B2 | 4/2012 | Van Diggelen |
| 8,212,719 B2 | 7/2012 | Van Diggelen et al. |
| 8,301,370 B2 | 10/2012 | Van Diggelen |
| 8,301,376 B2 | 10/2012 | Fuchs et al. |
| 8,514,126 B2 | 8/2013 | Van Diggelen et al. |
| 8,571,147 B2 | 10/2013 | Van Diggelen et al. |
| 8,581,779 B2 | 11/2013 | Van Diggelen et al. |
| 8,823,587 B2 | 9/2014 | Abraham et al. |
| 8,854,259 B2 | 10/2014 | Van Diggelen et al. |
| 8,902,104 B2 | 12/2014 | Van Diggelen |
| 8,930,137 B2 | 1/2015 | Van Diggelen |
| 8,963,773 B2 | 2/2015 | Van Diggelen et al. |
| 8,977,288 B2 | 3/2015 | Abraham et al. |
| 9,037,154 B2 | 5/2015 | Van Diggelen et al. |
| 9,274,225 B2 | 3/2016 | Abraham et al. |
| 9,405,013 B2 | 8/2016 | Van Diggelen |
| 9,482,739 B2 | 11/2016 | Mole |
| 9,562,976 B2 | 2/2017 | Van Diggelen et al. |
| 9,704,268 B2 | 7/2017 | Soto et al. |
| 10,459,089 B2 | 10/2019 | Van Diggelen et al. |
| 10,520,606 B2 | 12/2019 | Abraham et al. |
| RE48,176 E | 8/2020 | Van Diggelen et al. |
| 11,175,409 B2 | 11/2021 | Van Diggelen et al. |
| 2003/0008671 A1 | 1/2003 | Lundgren et al. |
| 2004/0203915 A1 | 10/2004 | Van Diggelen et al. |
| 2008/0125971 A1 | 5/2008 | Van Diggelen et al. |
| 2008/0186229 A1 | 8/2008 | Van Diggelen et al. |
| 2008/0189037 A1 | 8/2008 | Van Diggelen et al. |
| 2009/0231192 A1 | 9/2009 | Van Diggelen et al. |
| 2011/0148700 A1 | 6/2011 | Lasagabaster et al. |
| 2011/0199260 A1 | 8/2011 | Garrett et al. |
| 2012/0098700 A1 | 4/2012 | Van Diggelen |
| 2013/0099969 A1 | 4/2013 | Van Diggelen |
| 2013/0149974 A1 | 6/2013 | Lorenz et al. |
| 2014/0004877 A1 | 1/2014 | Van Diggelen et al. |
| 2014/0019044 A1 | 1/2014 | Zanutta et al. |
| 2014/0375495 A1 | 12/2014 | Fleming |
| 2015/0002308 A1 | 1/2015 | Walley et al. |
| 2015/0005029 A1 | 1/2015 | Medapalli et al. |
| 2015/0006616 A1 | 1/2015 | Walley et al. |
| 2015/0035700 A1* | 2/2015 | Van Diggelen ........ G01S 19/428 342/357.51 |
| 2017/0067999 A1* | 3/2017 | Chhokra ................ G01S 19/42 |
| 2017/0090037 A1* | 3/2017 | Ledvina ................. G01S 19/24 |
| 2017/0123071 A1* | 5/2017 | Zukerman .............. G01S 19/03 |
| 2017/0242131 A1 | 8/2017 | Mole et al. |
| 2018/0011200 A1 | 1/2018 | Ramamurthy |
| 2018/0074209 A1* | 3/2018 | Madhow ................ G01S 19/11 |
| 2019/0293803 A1* | 9/2019 | Carrie ................... G01S 19/22 |
| 2020/0264315 A1* | 8/2020 | Lennen ................. G01S 19/22 |
| 2022/0357751 A1* | 11/2022 | Thomson ................ G06T 7/33 |

OTHER PUBLICATIONS

Shadow Matching—Improved GNSS Accuracy in Urban Canyons Paul Groves GPS World Magazine Feb. 2012.

Urban Localizaiton and 3D Mapping Using GNSS Shadows Andrew Irish Inside GNSS Magazine Sep.-Oct. 2015.

* cited by examiner

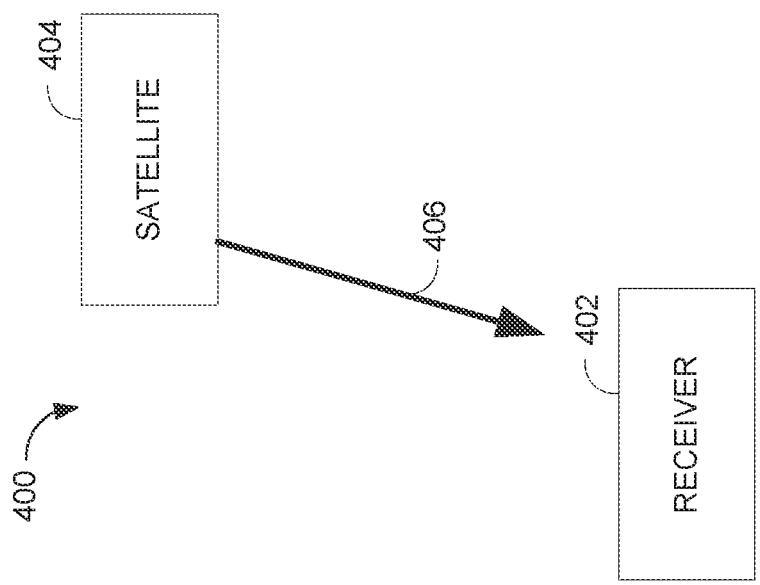

DETERMINING VELOCITY USING A REFLECTED POSITIONING SIGNAL

CROSS REFERENCE TO RELATED APPLICATION

The present application is the US National Phase under 35 U.S.C. § 371 of International Application PCT/US2019/020296, filed Mar. 1, 20219, which is hereby incorporated by reference in its entirety.

BACKGROUND

Smartphones, wearable computing devices, vehicle navigation systems, and other types of devices often include a receiver configured to perform location determination using the Global Positioning System (GPS), and other GNSS (Global Navigation Satellites Systems). GPS is a satellite-based navigation system that involves a network of satellites configured to transmit positioning signals (i.e., signals) to Earth while circling Earth in a precise orbit. Each satellite transmits signals that include information for receivers to use, such as an indication of the time that each signal was transmitted by the satellite and position information for the satellite. Other GNSS such as GLONASS, Galileo, BeiDou, QZSS, and IRNSS operate similarly, and may also be used for location determination.

A receiver may receive and use information within signals from multiple satellites to estimate its location. For example, the receiver may use trilateration to estimate the user's location on the surface of Earth by timing signals obtained from at least four GNSS satellites. Upon receiving a signal from a satellite, the receiver may determine the time that the signal was received at the receiver and compare that time to the time that the signal was transmitted by the satellite as indicated within the signal. The receiver may then determine the distance to the satellite based on the determined time difference. By using signals from four satellites, the receiver may determine its location. If the receiver has access to other measurements, such as its altitude, it may use these measurements in the position calculation to reduce the number of GNSS signals required. In addition to determining location, a receiver may also use GNSS to determine the receiver's current velocity.

SUMMARY

Some situations can arise where a receiver is unable to receive enough signals (e.g., four signals) directly from GNSS satellites. In particular, buildings, land structures (e.g., mountains), and other structures can interfere with the reception of a signal by blocking the direct path between a satellite and the receiver. In this description "interference" by buildings or other structures can mean blockage and/or reflections, diffraction and scattering of signals. As a result of interference, the receiver may indirectly receive a signal from a satellite in the form of a reflection after the signal reflected off one or more buildings prior to reaching the receiver. When a receiver relies upon a reflection for velocity calculations, the reflection may yield an inaccurate result. Accordingly, example embodiments presented herein involve techniques that enable a receiver to use a reflected signal to determine its velocity accurately.

In one aspect, an example method is provided. The method may include receiving, at a receiver, a set of positioning signals from a plurality of satellites. The method may further include identifying, from the set of positioning signals, a particular positioning signal that reflected off a reflecting plane prior to reaching the receiver. The method may also include, based on identifying the particular positioning signal, determining a reflected satellite position for a satellite that transmitted the particular positioning signal. The reflected satellite position is determined by reflecting a position of the satellite about the reflecting plane. The method may further involve determining a direction vector to the reflected satellite position for the satellite, and determining, at the receiver using the direction vector to the reflected satellite position, a velocity of the receiver.

In another aspect, a system is provided. The system may include a receiver and one or more processors. The one or more processors may be configured to obtain, from the receiver, a set of positioning signals from a plurality of satellites. The one or more processors may be configured to identify, from the set of positioning signals, a particular positioning signal that reflected off a reflecting plane prior to reaching the receiver. In addition, the one or more processors may be configured to, based on identifying the particular positioning signal, determining a reflected satellite position for a satellite that transmitted the particular positioning signal. The reflected satellite position is determined by reflecting a position of the satellite about the reflecting plane. The one or more processors may also be configured to determine a direction vector to the reflected satellite position for the satellite, and determine, using the direction vector to the reflected satellite position, a velocity of the receiver.

In a further aspect, a non-transitory computer readable medium is provided. The non-transitory computer readable medium has stored therein instructions executable by one or more processors to cause a computing system to perform functions. The functions may include receiving, at a receiver, a set of positioning signals from a plurality of satellites. The functions may also include identifying, from the set of positioning signals, a particular positioning signal that reflected off a reflecting plane prior to reaching the receiver. The functions may also include, based on identifying the particular positioning signal, determining a reflected satellite position for a satellite that transmitted the particular positioning signal. The reflected satellite position is determined by reflecting a position of the satellite about the reflecting plane. The functions may also include determining a direction vector to the reflected satellite position for the satellite and determining, using the direction vector to the reflected satellite position, a velocity of the receiver.

In an additional aspect, a system comprising means for determining velocity using a reflected signal is provided. The system may include means for performing the steps of the example method described above.

These as well as other aspects, advantages, and alternatives will become apparent to those of ordinary skill in the art by reading the following detailed description, with reference where appropriate to the accompanying drawings.

BRIEF DESCRIPTION OF THE FIGURES

FIG. 4A illustrates a receiver receiving a signal directly from a satellite, in accordance with example embodiments.

DETAILED DESCRIPTION

Figure 1:
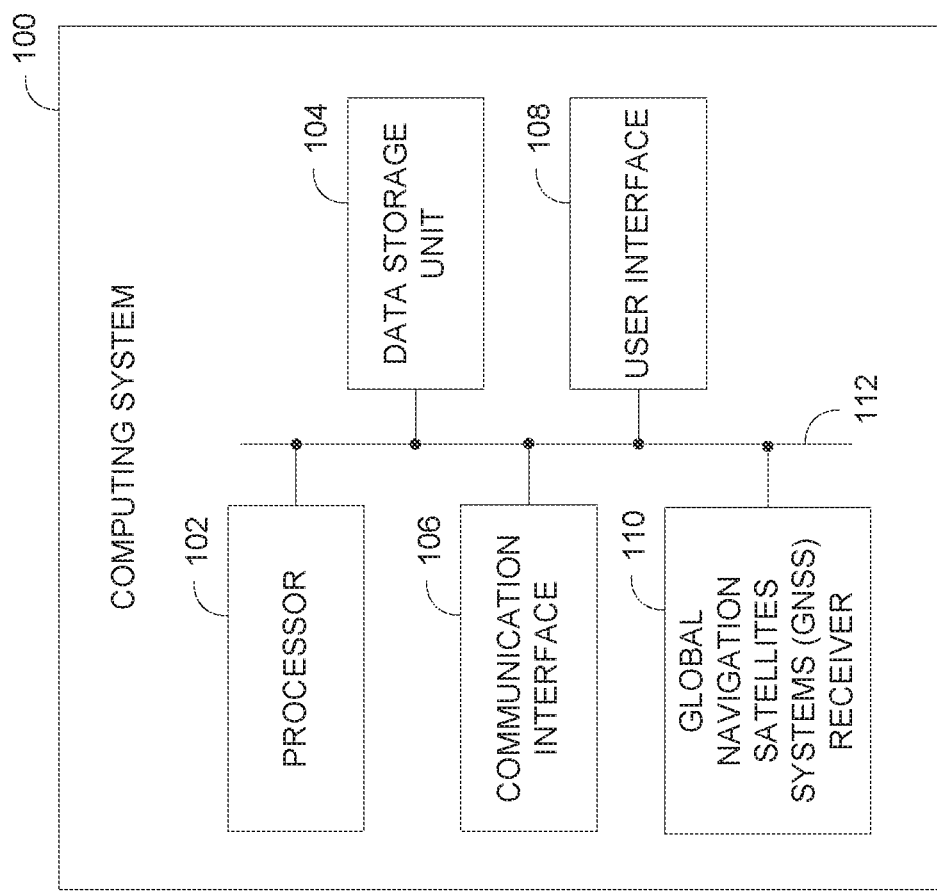
FIG. 1 is a simplified block-diagram of a computing system, in accordance with example embodiments.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Receivers are relied upon to provide location and velocity measurements for various types of devices, such as smartphones, wearable computing devices, and vehicle navigation systems. Particularly, since GNSS can serve an unlimited number of receivers due to their passive-mode of operation (i.e., a receiver is configured to receive signals only), numerous applications have been developed that utilize GNSS, including autonomous navigation, mapping and surveying, emergency rescue strategies, dating applications, and route determination during travel.

GNSS operates using a one-way time of arrival (TOA) ranging technique, which references the signals from satellites relative to accurate atomic frequency standards onboard each satellite. These atomic frequency standards are synchronized with a GNSS time base. Each GPS satellite broadcasts signals containing ranging codes and navigation data using code division multiple access (CDMA) on two frequency channels (L1: 1,575.42 MHz and L2: 1,227.6 MHz). Particularly, all satellites transmit on the two frequencies, but each satellite uses unique ranging codes. Newer GPS satellites transmit on a third frequency (L5: 1176.45 MHz). Other GNSS systems work in a generally similar way, with some system to system differences well known to those ordinarily skilled in the art.

Upon reception of a signal by a receiver, the navigation data enables the receiver to determine the location of the satellite at the time of signal transmission and the ranging codes enable the receiver to determine the propagation time of the signal. This way, the receiver can determine a satellite-to-receiver range and may further determine its latitude, longitude, height, and receiver clock offset relative to internal satellite system time when using TOA ranging measurements acquired from four satellites.

GNSS also enables a receiver to determine velocity via various techniques. In some cases, a receiver may be designed to difference two consecutive positions of the receiver to estimate its velocity. This technique, however, can yield results with limited accuracy rendering it less ideal for some applications (e.g., safe navigation of a vehicle).

Another technique a receiver may utilize to determine velocity involves using Doppler measurements derived from receiver-satellite motion. Doppler information has broad applications in signal processing, such as a technique receivers use to discriminate between the signals from multiple satellites. When determining velocity, a receiver may use Doppler data to determine the range rate between the receiver and the transmitting satellite. The range rate represents the rate at which the range between the satellite and the receiver changes over a particular period of time.

To determine range rate, the receiver may perform coherent integration and multiply a received signal by a local copy of a spreading code that, ideally, maintains phase coherency with the received signal. If the Doppler of the signal changes, then the Doppler of the local copy of the spreading code needs to be adjusted to maintain phase coherency. A change in the receiver's velocity can cause a Doppler shift, which can be measured to compute velocity accurately. In particular, the receiver may determine the new Doppler value using the receiver's new velocity dot-product a unit vector directed towards the direction of the satellite that is transmitting the tracked signal. Using this technique, the receiver may accurately determine its velocity within a few centimeters per second.

Some situations may arise where the receiver is tracking a reflection of a signal from a satellite rather than a signal received directly from the satellite without interference. In particular, areas with large buildings and other structures (e.g., mountains) may interfere with the receiver's ability to receive signals directly from the satellite. Due to the interference, the receiver may indirectly receive signals from a satellite in the form of reflections off reflecting planes (e.g., a point on building) since the direct path may be blocked. When the receiver uses a reflection to calculate velocity, the direction that the signal is approaching and received at the receiver can differ from the actual direction of the satellite. The reflection may cause the signal to appear to be arriving from a particular direction that differs from the actual direction of the satellite. In turn, the receiver may inaccurately determine its velocity since the direction vector within calculations points towards the satellite's actual position and differs from the incoming direction of the reflection. Thus, there exists a need to be able to use a reflected signal to accurately determine a receiver's velocity.

Example embodiments presented herein provide techniques for determining velocity accurately using one or more reflected signals. An example technique may enable a receiver to determine its velocity accurately despite operating in an area with structures that potentially interfere with the direct reception of satellite signals. In particular, the technique involves adjusting calculations such that the unit vector used to compute a new Doppler value is directed towards a reflected position of the satellite rather than the actual position of the satellite when the receiver uses a reflection of a signal instead of a directly received signal. The reflected satellite position may be determined by reflecting the actual position of the satellite about the reflecting plane which the signal reflected off prior to reaching the receiver. The reflecting plane may be located on a building or another structure that reflected the signal towards the receiver. By using a unit vector based on the reflected satellite position within velocity calculations in response to a Doppler measurement, the receiver may yield an accurate velocity measurement.

To further illustrate, another example embodiment may involve a receiver initially obtaining a set of GNSS signals. For instance, the receiver may receive four signals and use the signals to determine its location via trilateration. From the set of signals, the receiver may identify a particular signal that appears to have reflected off a reflecting plane (e.g., a point on a building) prior to reaching the receiver. The receiver may identify a reflection using one or more factors, such as information specifying a location of the satellite, an angle of arrival that specifies the angle at which the reflection arrived at the receiver, the strength of the signal, and topography information for the current location of the receiver, among others.

When relying upon the reflection to monitor for Doppler shifts that may arise as a result of a change in the receiver's velocity, the receiver may be configured to adjust calculations in light of identifying that the signal is a reflection. In particular, the receiver may determine the building or other structure that reflected the signal prior to the signal reaching the receiver as a reflection (i.e., identify the reflecting plane). The receiver may then reflect the actual position of satellite about the reflecting plane to generate a reflected satellite position for the satellite. This reflected satellite position, as discussed above, may then be used to determine a unit vector that extends from the receiver in the direction towards the reflected satellite position. The determined unit vector can be subsequently used within velocity calculations to produce an accurate velocity measurement.

Within examples, the receiver or another computing device (e.g., one or more processors) may be configured to perform operations related to using signals for velocity measurement of the receiver. For example, the receiver may be a component of a computing device that further includes a GNSS component configured to perform one or more operations related to measuring velocity of the computing device. In another example, a server device may be configured to perform one or more operations presented herein.

In some embodiments, a receiver (or associated computing device) may be configured to categorize satellites based on received signals and determine whether signals are received from Line of Sight (LOS) satellites or Non-Line of Sight (NLOS) satellites. A satellite qualifies as a LOS satellite when there is a direct path between the satellite and the receiver for signals to traverse. More specifically, the receiver may receive signals directly from the LOS satellite without any buildings, land structures, or other physical entities interfering with the path of travel. When using long coherent integration and the signals are from a LOS satellite, the receiver may compute expected Doppler values using the receiver velocity dot-product the unit vector from the receiver in a direction to the actual position of the satellite.

A satellite qualifies as a NLOS satellite when some structure (e.g., a building) interferes with the direct path between the satellite and the receiver. Due to the interference, the receiver may be unable to receive signals from the NLOS satellite or may receive scattered or reflections of the signals after the signals bounce off one or more reflecting planes (e.g., one or more buildings). When using long coherent integration and the signal is from a NLOS satellite, the receiver may compute expected Doppler values using the receiver velocity dot-product the unit vector with the unit vector extending from the receiver to a reflected satellite position. In such a situation, the receiver may need to identify the reflecting plane (e.g., which building reflected the signal towards the receiver or a particular point on the building that reflected the signal) to be able to determine the reflected satellite position for the satellite that originally transmitted the signal.

In some examples, the receiver may receive multiple reflections of similar strength from a NLOS satellite. In such a situation, the receiver may be configured to perform shorter coherent integration or search over a combination of the reflections to identify the strongest reflection. The receiver may utilize one or both of these strategies due to the uncertainty in the expected Doppler that can be caused when multiple reflections arrive at the receiver. In addition, in some cases, a receiver may be unable to determine whether a signal is a signal received from a LOS satellite or a reflection from a NLOS satellite. As such, the receiver may be configured to discard these signals when unable to ascertain the source of the signals above a predefined threshold confidence.

In some example embodiments, a receiver may be configured to initially determine its location prior to calculating its velocity. For instance, the receiver may identify the street that a user is currently traveling upon. After determining the initial location, the receiver may proceed to categorize the satellites that are currently providing the signal utilized by the receiver. More specifically, the receiver may identify: (i) the satellites that are currently LOS satellites, (ii) the satellites that are currently NLOS satellites with well-defined reflecting planes, and (iii) the satellites that do not qualify as either (i) or (ii).

A satellite may not qualify if the signal is so close to the edge of a building that the uncertainty in the receiver position may change the signal from LOS to NLOS (or vice versa) or from NLOS from one reflecting plane to NLOS with a different reflecting plane. In addition, a satellite may also not qualify if the receiver is receiving more reflections of a signal or multiple signals from the NLOS satellite from more than one reflecting plane. For example, multiple buildings may cause the receiver to receive multiple reflections of signals from the same satellite from multiple reflecting planes (e.g., multiple buildings). After categorizing the satellites, the receiver may adjust velocity calculations when using one or more signals from one or more NLOS satellites with well-defined reflecting planes.

Some embodiments may involve a receiver utilizing a signal that reflected off multiple reflecting planes (e.g., multiple buildings) prior to reaching the receiver. In such a situation, the receiver may determine that there are no other signals from that satellite converging on the receiver. In response to determining that the receiver is receiving the signal off multiple reflecting planes without receiving other NLOS signals from the same satellite, the receiver may be configured to reflect the satellite about each reflecting plane until obtaining the final reflection position of the satellite. In particular, the final reflected position for the satellite may be derived using the last reflecting plane that reflected the signal before the reflection reached the receiver. The receiver may use the final reflecting place to determine the direction vector for the NLOS satellite that can be subsequently used when calculating the receiver's velocity.

Systems, methods, and devices in which examples may be implemented will now be described in greater detail. In general, described methods may be implemented by various types of computing devices or components of the devices. In one example, a system may include one or more servers, which may receive information from and provide information to a device, such as a mobile phone. However, the described methods may also be implemented by other computing devices, such as a personal computer, a wearable computing device, stand-alone receiver, or a mobile device, among others.

Further, an example system may take the form of a computer readable medium, which has program instructions stored thereon that are executable by a processor to provide functionality described herein. Thus, an example system may take the form of a device such as a server, or a subsystem of such a device, which includes such a computer readable medium having such program instructions stored thereon.

Referring now to the figures, FIG. 1 is a simplified block-diagram of an example computing system 100 that can perform various acts and/or functions, such as those described in this disclosure. Computing system 100 may correspond to any type of device, such as a smartphone, portable computer, or wearable computing device, etc., and can include various components, such as processor 102, data storage unit 104, communication interface 106, user interface 108, and/or GNSS receiver 110.

These components as well as other possible components can connect to each other (or to another device, system, or other entity) via connection mechanism 112, which represents a mechanism that facilitates communication between two or more devices, systems, or other entities. As such, connection mechanism 112 can be a simple mechanism, such as a cable or system bus, or a relatively complex mechanism, such as a packet-based communication network (e.g., the Internet). In some instances, a connection mechanism can include a non-tangible medium (e.g., where the connection is wireless). In a further implementation, computing system 100 can include more or fewer components and may correspond to a standalone receiver configured to perform location determination processes described herein.

Processor 102 may correspond to a general-purpose processor (e.g., a microprocessor) and/or a special-purpose processor (e.g., a digital signal processor (DSP)). In some instances, computing system 100 may include a combination of processors.

Data storage unit 104 may include one or more volatile, non-volatile, removable, and/or non-removable storage components, such as magnetic, optical, or flash storage, and/or can be integrated in whole or in part with processor 102. As such, data storage unit 104 may take the form of a non-transitory computer-readable storage medium, having stored thereon program instructions (e.g., compiled or non-compiled program logic and/or machine code) that, when executed by processor 102, cause computing system 100 to perform one or more acts and/or functions, such as those described in this disclosure. Computing system 100 can be configured to perform one or more acts and/or functions, such as those described in this disclosure. Such program instructions can define and/or be part of a discrete software application. In some instances, computing system 100 can execute program instructions in response to receiving an input, such as from communication interface 106 and/or user interface 108. Data storage unit 104 may also store other types of data, such as those types described in this disclosure.

Communication interface 106 can allow computing system 100 to connect to and/or communicate with another other entity according to one or more protocols. In an example, communication interface 106 can be a wired interface, such as an Ethernet interface or a high-definition serial-digital-interface (HD-SDI). In another example, communication interface 106 can be a wireless interface, such as a cellular or WI-FI interface. A connection can be a direct connection or an indirect connection, the latter being a connection that passes through and/or traverses one or more entities, such as such as a router, switcher, or other network device. Likewise, a transmission can be a direct transmission or an indirect transmission.

User interface 108 can facilitate interaction between computing system 100 and a user of computing system 100, if applicable. As such, user interface 108 can include input components such as a keyboard, a keypad, a mouse, a touch sensitive panel, a microphone, and/or a camera, and/or output components such as a display device (which, for example, can be combined with a touch sensitive panel), a sound speaker, and/or a haptic feedback system. More generally, user interface 108 can include hardware and/or software components that facilitate interaction between computing system 100 and the user of the computing device system.

GNSS receiver 110 represents a component that computing system 100 may include for location and velocity determination processes. GNSS receiver 110 may correspond to various types of receivers that may perform GNSS locations. For instance, GNSS receiver 110 may receive signals from satellites to use to perform location and velocity determination processes. As such, GNSS receiver 110 may operate using assistance from one or more processors 102, a power supply, and various interfaces, such as a display interfaced and audio interface.

In some instances, GNSS receiver 110 may perform trilateration, and/or other processes to determine the location of computing system 100. Trilateration is similar to identifying a location on a map knowing the precise distance from three different landmarks using a pair of compasses, where the location may correspond to the point that the three circles centered on each of the landmarks overlap given that the radius of each circle corresponds to the distance from each landmark. In practice, a location using GNSS is performed using trilateration as implemented with a set of simultaneous equations, where each equation describes the distance to one particular satellite as a function of the receiver location. In most instances there will be four or more simultaneous equations.

GNSS receiver 110 may use signals from a set of satellites to calculate velocity of the receiver's user using various techniques. In some examples, GNSS receiver 110 may estimate velocity by differencing two consecutive positions (i.e., approximating the derivative of user position). This technique may be simple to execute, but may be less accurate than other techniques. In particular, differencing two consecutive positions may produce results that have a meter per second-level of accuracy due to the dependence on pseudorange-based position accuracy.

In other examples, GNSS receiver 110 may determine velocity of computing system 100 by using Doppler measurements related to user-satellite motion. Doppler frequency shifts of the received signal produced by user-satellite relative motion may enable velocity to be determined accurately within a few centimeters per second. In addition, GNSS receiver 110 may increase performance by processing differences of consecutive carrier phase measurements (time-differenced carrier phase (TDCP)). Such a strategy may enable GNSS receiver 110 to calculate velocity one order of magnitude more accurately than using only raw Doppler measurements output from the receiver's tracking loops.

As such, GNSS receiver 110 may enable computing system 100 or applications on computing system 100 to quickly access and use location, velocity, and direction information.

In general, location may be determined in three dimensions, including altitude. GNSS receiver 110 may be configured to supplement location determination with information received via Bluetooth or Wi-Fi signals.

As indicated above, connection mechanism 112 may connect components of computing system 100. Connection mechanism 112 is illustrated as a wired connection, but wireless connections may also be used in some implementations. For example, the communication link 112 may be a wired serial bus such as a universal serial bus or a parallel bus. A wired connection may be a proprietary connection as well. Likewise, the communication link 112 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, LTE, or 5G), or Zigbee® technology, among other possibilities.

Figure 2:
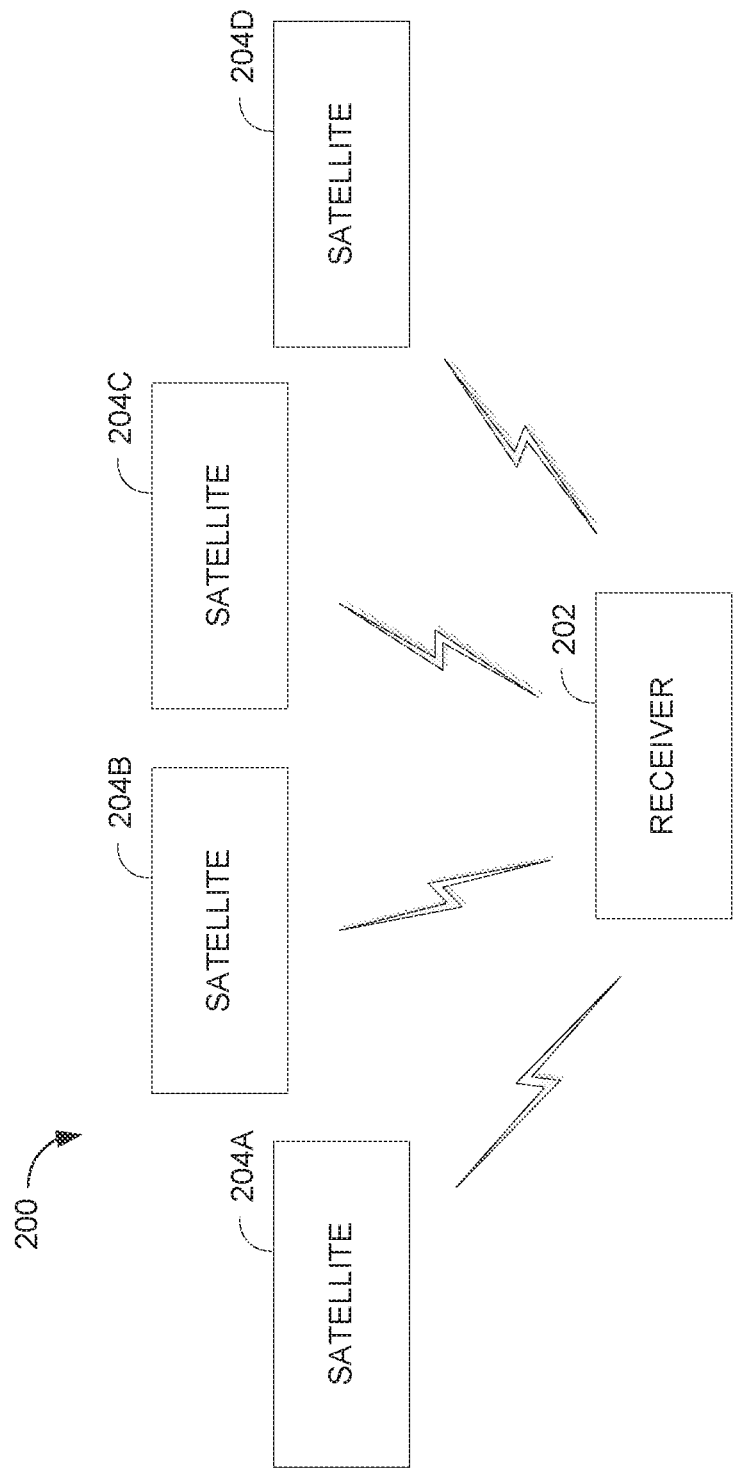
FIG. 2 illustrates location determination using signals from a set of satellites, in accordance with example embodiments.

FIG. 2 illustrates receiver 202 determining location using signals from a set of satellites. In particular, FIG. 2 depicts scenario 200 to represent a general situation involving receiver 202 receiving and using signals from multiple satellites (satellite 204A, satellite 204B, satellite 204C, and satellite 204D) to determine the user's location. Within other implementations, scenario 200 may involve more or fewer satellites and/or receivers.

As shown, receiver 202 is receiving signals from a set of satellites (satellite 204A, satellite 204B, satellite 204C, and satellite 204D). Receiver 202 may correspond to computing system 100 and/or another device with more or fewer components. For example, receiver 202 may correspond to a smartphone, wearable computing device, or a vehicle GNSS system, among other possible devices.

Satellites 204A-204D as well as other satellites in the GNSS network may orbit Earth and periodically transmit signals having information that receivers may use for location determination. Each transmitted signal may include information that assists receivers perform location determination, such as an indication of the time that the satellite transmitted the signal towards the surface of Earth based on the satellite's atomic clock. A transmitted signal may also provide other information, such as an indication of the relationship between the satellite's clock and GPS time, or the reference time of other GNSS, and precise orbit information that helps the receiver determine a position of the transmitting satellite. As such, receiver 202 as well as other receivers may receive and use the periodically transmitted signals from the set of satellites to determine location and/or other possible information, such as velocity. Reception of signals from multiple satellites (e.g., four satellites) may enable a receiver to perform location determination processes, such as the trilateration calculations described above.

In some instances, one or more signals received at receiver 202 may have reflected off one or more features, such as building or other mechanical structures prior to reaching receiver 202. For example, receiver 202 may have a position in a city that includes multiple large buildings that may reflect signals from satellites 204A-204D when receiver 202 is positioned near the buildings. As such, receiver 202 may perform processes described herein to determine an accurate location that may factor the extra paths traveled by one or more signals due to reflections.

Overall, receiver 202 may receive signals in various ways, such as some signals directly from the transmitting satellites and some signals after the signals reflect off one or more features positioned in the general location of receiver 202. Additionally, although not shown in FIG. 2, receiver 202 may also fail to receive some signals from a given satellite due to one or more features completely blocking all paths between the given satellite and receiver 202.

Figure 3:
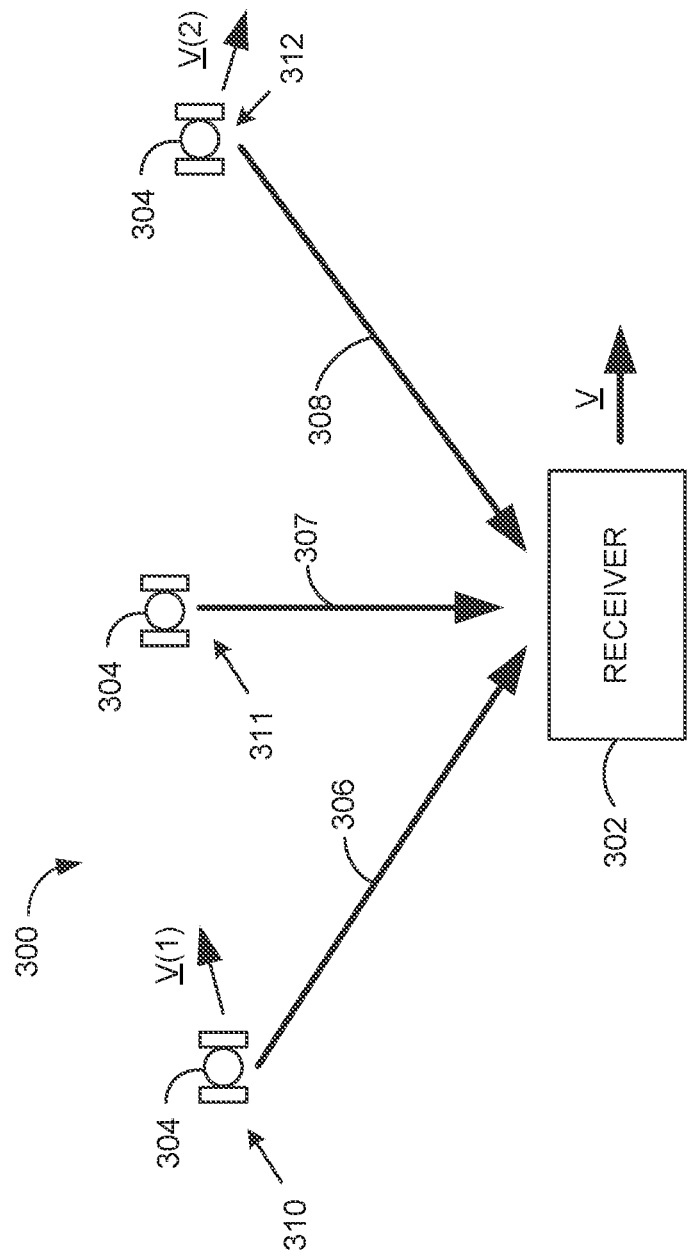
FIG. 3 illustrates velocity determination, in accordance with example embodiments.

FIG. 3 illustrates velocity determination by a receiver, in accordance with example embodiments. Scenario 300 depicts receiver 302 receiving signals from satellite 304 as position of satellite 304 changes relative to receiver 302. Although only satellite 304 is shown in FIG. 3, receiver 302 may use signals from other satellites (e.g., four satellites total) to accurately determine its velocity.

Receiver 302 represents any type of device having a receiver configured to passively receive signals from GNSS. In some examples, receiver 302 may correspond to a vehicle navigation system and may be configured to continuously measure changes in velocity.

Receiver 302 may also correspond to a standalone receiver.

As discussed above, receiver 302 may be configured to calculate the velocity using various techniques. For instance, receiver 302 may be configured to estimate velocity by forming an approximate derivative of the receiver's position as follows:

$$\dot{r} = \frac{dr}{dt} = \frac{r(t_2) - r(t_1)}{t_2 - t_1} \quad [1]$$

Utilizing equation 1 may enable receiver 302 to determine velocity as long as the velocity is nearly constant over the selected time interval (i.e., not subjected to acceleration or jerk during the time between a first time ($t_1$) and a second time ($t_2$)). Thus, even though estimating the velocity of receiver 302 via differencing two consecutive positions may be simple for receiver 302 to perform, receiver 302 may use other techniques to improve accuracy, such as processing carrier-phase measurements.

Processing carrier-phase measurements may enable receiver 302 to precisely estimate the Doppler frequency of the received satellite signals (e.g., signals 306, 307, 308). As discussed above, a Doppler shift is produced by the relative motion of satellite 304 with respect to receiver 302. A satellite velocity vector v may be computed using ephemeris information and an orbital model that is accessible by receiver 302 (e.g., stored in memory at receiver 302). Ephemeris information can provide the trajectory (e.g., the position and velocity) of satellite 304 and other satellites over time.

As satellite 304 orbits, the frequency received at receiver 302 increase as satellite 304 approaches receiver 302 (e.g., from first position 310 and second position 311) and decreases as satellite 304 recedes from receiver 302 (e.g., from second position 311 to third position 312). Thus, the frequency received at receiver 302 increases as satellite 304 moves towards receiver 302 from first position 310 towards second position 311 and decreases as satellite 304 moves away from receiver from second position 311 towards third position 312. As such, the Doppler shift is zero when satellite 304 is at its closest position relative to receiver 302 (e.g., when satellite 304 is positioned at second position 311 above receiver 302). At this point, the radial component of the velocity of satellite 304 relative to receiver 302 is zero. As satellite 304 passes through this point (i.e., second position 311), frequency changes sign (i.e., the sign of A changes). At receiver 302, the received frequency ($f_R$) can be approximated by the Doppler equation as follows:

$$f_R = f_T\left(1 - \frac{(v_r \cdot a)}{c}\right) \quad [2]$$

where $f_T$ represents the transmitted satellite signal frequency, $v_r$ is the satellite-to-receiver relative velocity vector, a is the unit vector pointing along the line of sight from receiver 302 to satellite 304, and c is the speed of propagation. The dot product $v_r \cdot a$ represents the radial component of the relative velocity vector along the line of sight to satellite 304. As such, vector $v_r$ is given as the velocity difference as follows:

$$v_r = v - \dot{r} \quad [3]$$

where v is the velocity of satellite 304, and $\dot{r}$ is the velocity of the receiver 302, both referenced to a common earth-centered, earth-fixed (ECEF) frame. The Doppler offset due to the relative motion is obtained from these relations as follows:

$$\Delta f = f_R - f_T = -f_T \frac{(v - \dot{r}) \cdot a}{c} \quad [4]$$

A receiver, such as receiver 302, may use various techniques to obtain user velocity from the received Doppler frequency. For instance, an example technique may assume that the position of receiver 302 r has been determined and its displacement ($\Delta x_u$, $\Delta y_u$, $\Delta z_u$) from the linearization point is within requirements of receiver 302. In addition to computing the three-dimensional receiver velocity $\dot{r} = (\dot{x}_r, \dot{y}_r, \dot{z}_r)$, the technique may involve determining receiver 302 clock drift $\dot{t}_r$. Thus, for the nth satellite, substituting equation 3 into equation 2 produces the following:

$$f_{Rn} = f_{Tn}\left\{1 - \frac{1}{c}[(v_n - \dot{r}) \cdot a_n]\right\} \quad [5]$$

The satellite transmitted frequency $f_{Tn}$ is the actual transmitted satellite frequency. Satellite frequency generation and timing may configured based on a highly accurate free running atomic standard, which may be offset from system time.

Some corrections may be generated by the ground-control/monitoring network periodically to correct for this offset. For example, corrections may be available in the navigation message and can be applied by the receiver to obtain the actual satellite transmitted frequency. As a result, the following may be determined:

$$f_{Tn} = f_0 + \Delta f_{TN} \quad [6]$$

where $f_0$ represents the nominal transmitted satellite frequency, and $\Delta f_{Tn}$ represents the correction determined from the navigation message update.

The measured estimate of the received signal frequency is denoted $f_n$ for the signal from the nth satellite (e.g., satellite 304). These measured values are in error and differ from the $f_{Rn}$ values by a frequency bias offset. This offset can be related to the drift rate to of the user clock relative to GPS system time. The value $\dot{t}_u$ to has the unit of seconds/second and essentially gives the rate at which the clock of receiver 302 is running fast or slow relative to GPS system time. The clock drift error, $f_n$, and $f_{Rn}$, can be related by the formula below:

$$f_{Rn} = f_n(1 + \dot{t}_u) \quad [7]$$

where $\dot{t}_u$ is considered positive if clock of receiver 302 is running fast. Substitution of equation 7 into equation 5 produces the following:

$$\frac{c(f_n - f_{Tn})}{f_{Tn}} + v_n \cdot a_n = \dot{u} \cdot a_n - \frac{cf_n \dot{t}_u}{f_{Tn}} \quad [8]$$

Expanding the dot products in terms of the vector components yields:

$$\frac{c(f_n - f_{Tn})}{f_{Tn}} + v_{xn}a_{xn} + v_{yn}a_{yn} + v_{zn}a_{zn} = \dot{x}_u a_{xn} + \dot{y}_u a_{yn} + \dot{z}_u a_{zn} - \frac{cf_n \dot{t}_u}{f_{Tn}} \quad [9]$$

where $$v_n = (v_{xn}, v_{yn}, v_{zn}), a_n = (a_{xn}, a_{yn}, a_{zn}), \dot{u} = (\dot{x}_u, \dot{y}_u, \dot{z}_u).$$

Thus, all of the variables on the left side of equation 9 are either calculated or derived from measured values. The components of $a_n$ are obtained during the solution for receiver 302 location (which is assumed to precede the velocity computation). The components of $v_n$ are determined from the ephemeris data and the satellite orbital model. The $f_{Tn}$ can be estimated using equation 6 shown above and the frequency corrections derived from the navigation updates. In some cases, the frequency corrections may not be needed and $f_{Tn}$ can be replaced by $f_0$. The $f_n$ can be expressed in terms of receiver measurements of delta range.

To simplify equation 9, variable $d_n$ may be used, where $$d_n = \frac{c(f_n - f_{Tn})}{f_{Tn}} + v_{xn}a_{xn} + v_{yn}a_{yn} + v_{zn}a_{zn} \quad [10]$$

The term $f_n/f_{Tn}$ shown in equation 9 can be approximated to 1 without causing errors in calculations. As a result, equation 9 can be rewritten as $$d_n = \dot{x}_r a_{xn} + \dot{y}_r a_{yn} + \dot{z}_r a_{zn} - c\dot{t}_r \quad [11]$$

Thus, there are four unknowns: $\dot{r} = \dot{x}_r, \dot{y}_r, \dot{z}_r, \dot{t}_r$ which can be solved by using measurements from four satellites. The unknown quantities can be determined by solving the set of linear equations using matrix algebra. The matrix/vector scheme is as follows:

$$d = \begin{bmatrix} d_1 \\ d_2 \\ d_3 \\ d_4 \end{bmatrix} \quad H = \begin{bmatrix} a_{x1} & a_{y1} & a_{z1} & 1 \\ a_{x2} & a_{y2} & a_{z2} & 1 \\ a_{x3} & a_{y3} & a_{z3} & 1 \\ a_{x4} & a_{y4} & a_{z4} & 1 \end{bmatrix} \quad g = \begin{bmatrix} \dot{x}_r \\ \dot{y}_r \\ \dot{z}_r \\ -c\dot{t}_r \end{bmatrix} \quad [12]$$

As shown above, H is identical to a matrix used in the formulation for a receiver position determination. In matrix notation, $$d = Hg \quad [13]$$

and the solution for the velocity and time drift are obtained as:

$$g = H^{-1}d \quad [14]$$

The phase measurements that lead to the frequency estimates used in the velocity formulation may be corrupted by errors such as measurement noise and multipath. Furthermore, the computation of the velocity of receiver 302 is dependent on the position accuracy of receiver 302 and accurate knowledge of satellite ephemeris and satellite velocity. In some examples, if measurements are made to more than four satellites, least squares estimation techniques may be employed to obtain improved estimates of the unknowns.

FIG. 4A illustrates example scenario 400 showing receiver 402 receiving signal 406 directly from satellite 404. In some situations, a receiver may be located such that the receiver can receive signals from satellites without interference from buildings or other tall structures. For example, a receiver positioned in an open area without any tall structures can often receive enough signals to accurately estimate its velocity. In such a situation, the transmitting satellite may be considered a LOS satellite with respect to the receiver since the line-of sight between the satellite and the receiver is open (i.e., no interference).

As shown in scenario 400, receiver 402 is positioned to receive signal 406 via a direct path from satellite 404 without any interference. As a result, satellite 404 can be considered as a LOS satellite in its current position relative to receiver 402. Thus, signal 406 can be used for location and velocity calculations without additional modification. In some examples, receiver 402 may use its approximate location and topography information for the location in addition to the position and orientation of satellite 404 to determine that signal 406 was received without interference.

Figure 4B:
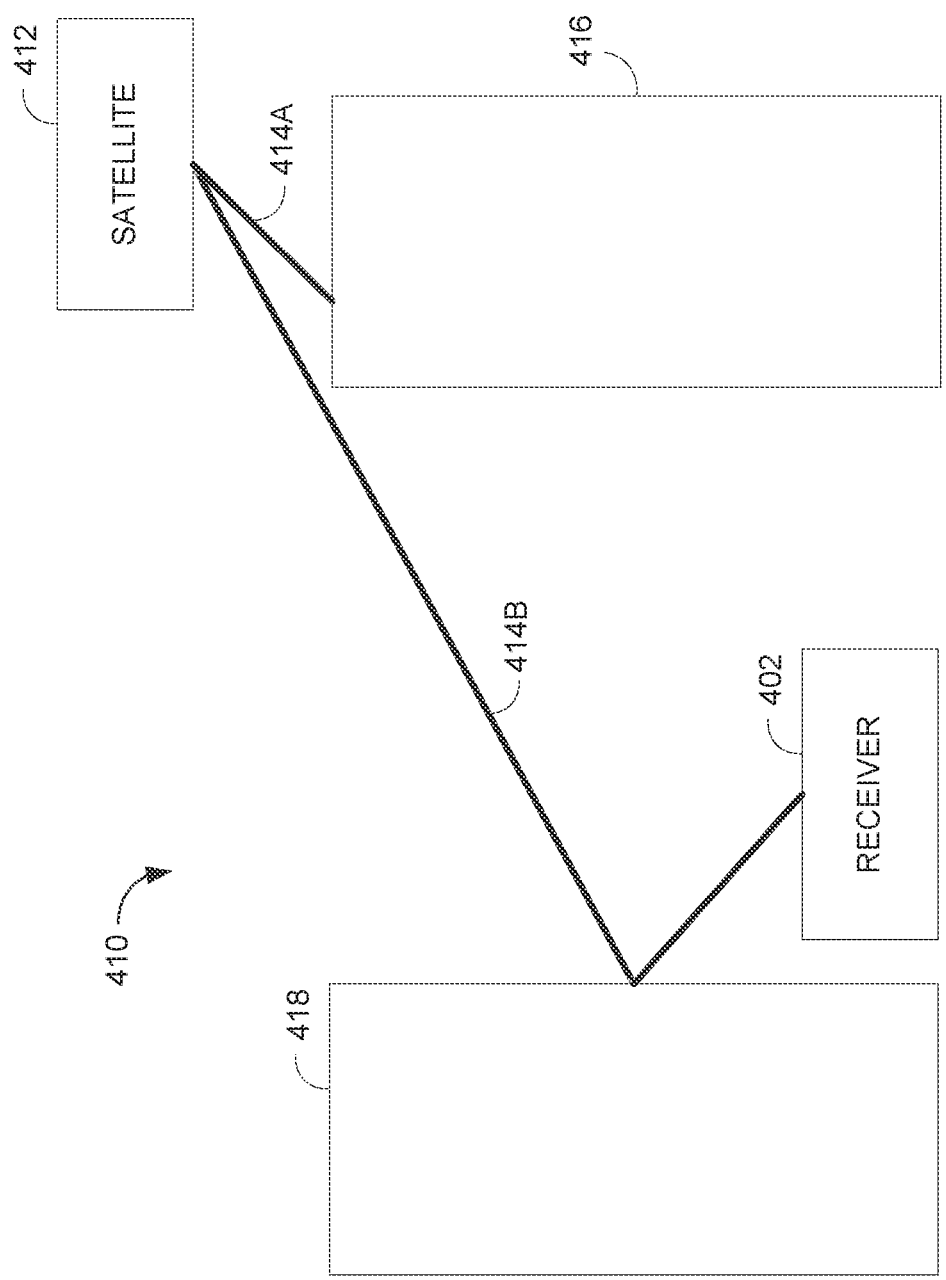
FIG. 4B illustrates the receiver receiving a reflection of a signal, in accordance with example embodiments.

FIG. 4B illustrates example scenario 410 showing receiver 402 receiving reflected signal 414B after failing to receive signal 414A directly from satellite 412. In some situations, a receiver may encounter interference with signal reception due to large buildings or other structures that can block or reflect signals prior to the signals reaching the receiver.

Scenario 410 represents an example situation where receiver 402 is blocked from receiving signal 414A directly from satellite 412 due to the presence of feature 416. In particular, feature 416 may represent a large building or another type of structure that can prevent receiver 402 and other receivers positioned nearby feature 416 from receiving signals from one or more transmitting satellites. As shown, feature 416 is positioned in a manner that completely blocks the path of signal 414A transmitted by satellite 412 from its orientation and position in orbit relative to receiver 402.

Although receiver 402 is shown unable to receive signal 414A directly from satellite 412, receiver 402 may still receive and use signals from satellite 412 for location determination. As further shown in scenario 410, receiver 402 may receive reflected signal 414B after signal 414B reflects off feature 418. Upon receiving signal 414B, receiver 402 may identify that signal 414B likely corresponds to a reflection based on various factors, such as the position and orientation of satellite 412 relative to receiver 402, topography information, angle of reception of signal 414B and the position of receiver 402 relative to satellite 412. For instance, receiver 402 may use the topography information and position and orientation of satellite 412 to determine that feature 416 has a position relative to receiver 402 and an overall elevation that causes feature 416 to prevent receiver 402 from receiving signal 414A directly from satellite 412. This analysis may further assist receiver 402 determine that signal 414B is likely a reflection based on the positioning of receiver 402 relative to feature 418 and the general position of satellite 412.

Figure 5:
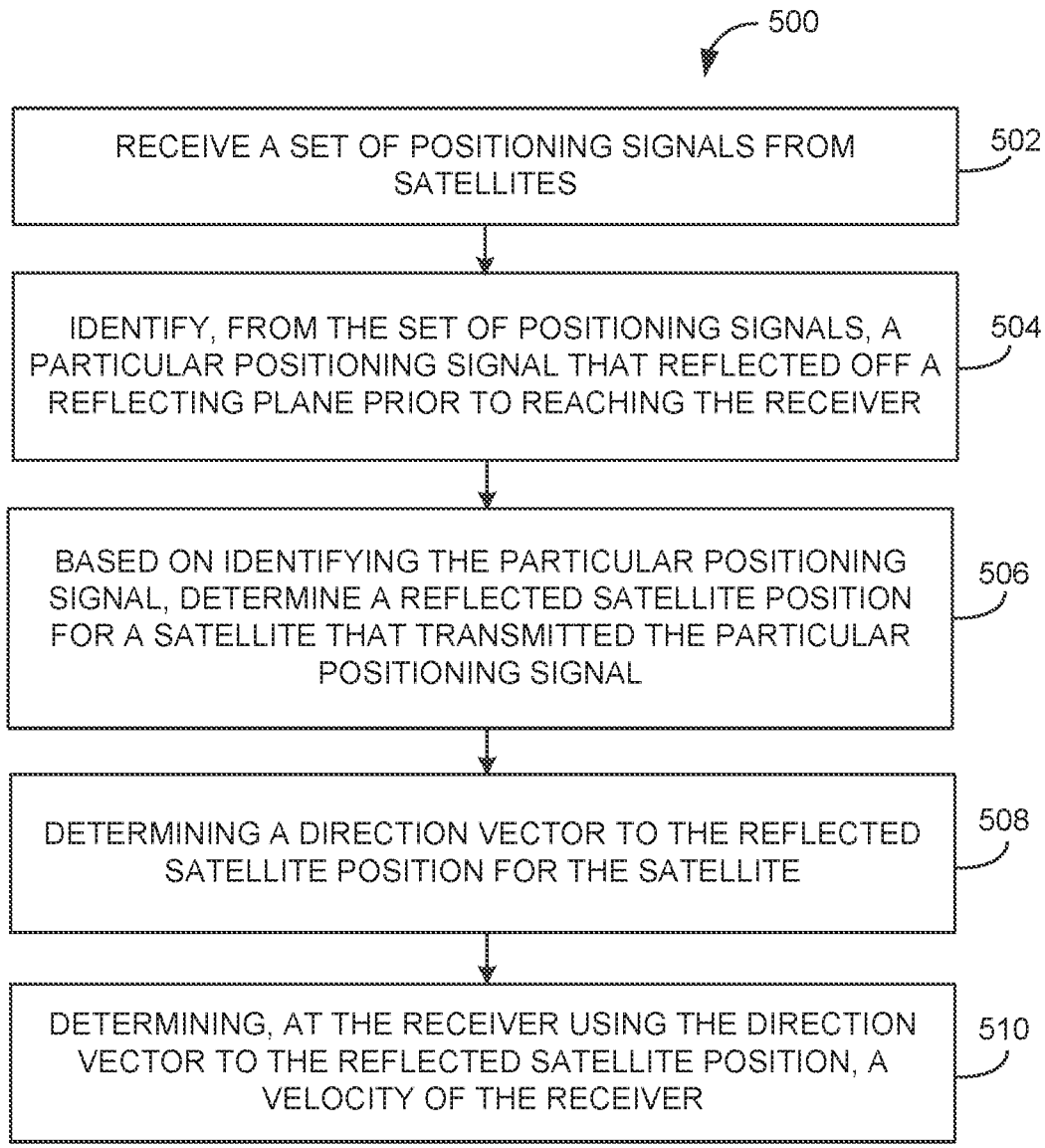
FIG. 5 is a flowchart for a method, in accordance with example embodiments.

FIG. 5 is a flow chart of a method 500 for velocity determination. Method 500 may include one or more operations, functions, or actions as illustrated by one or more of blocks 502, 504, 506, 508, and 510. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, a tangible storage device, or other article of manufacture, for example. Furthermore, for method 500 and other processes and methods disclosed herein, each block in FIG. 5 may represent circuitry that is wired to perform the specific logical functions in the process.

At block 502, method 500 involves receiving a set of positioning signals from satellites. In some examples, each positioning signal may be received from a different satellite. A receiver (e.g., receiver 202) may receive signals from multiple satellites operating in the GNSS network. The receiver may use the signals from multiple satellites to determine location and/or other information, such as the current velocity of the receiver. In other examples, the receiver may receive and track multiple signals (e.g., 2 or more signals) from the same satellite. For instance, the receiver may be configured to monitor dual frequency signals (e.g., L1 and L5) from the same satellite.

In some implementations, the receiver may use an indication of the time at which the satellite transmitted the signal according to the satellite's clock and orbit information that describes a position of the satellite relative to the receiver when performing location calculations. In some examples, the receiver may receive signals from at least four satellites to enable trilateration determination. In addition, the receiver may detect a Doppler shift in response to receiving the positioning signal from the satellites.

At block 504, method 500 involves identifying, from the set of positioning signals, a particular positioning signal that reflected off a reflecting plane prior to reaching the receiver.

In some instances, the receiver may identify the particular signal that is a reflection in response to detecting a Doppler shift.

In some examples, the receiver may determine a location of the receiver using the set of signals. The receiver may obtain a predefined map of reflecting planes for location of the receiver. Based on the predefined map of reflecting planes and information within each positioning signal, the receiver may identify, from the set of positioning signals, one or more positioning signals that originate from Line-of-Sight (LOS) satellites and one or more positioning signals that originate from Non-Line-of-Sight (NLOS) satellites.

In some examples, the receiver (or associated computing device) may identify a second positioning signal that reflected off a second reflecting plane prior to reaching the receiver within the set of positioning signals. The receiver may perform a comparison between the particular positioning signal and the second positioning signal and discard the second positioning signal when determining the receiver's velocity based on the comparison. For example, the receiver may determine that the satellite that transmitted the particular positioning signal also transmitted the second positioning signal and determine that the particular signal is dominant over the second positioning signal. The particular signal and second signal may both be reflections of the same signals arriving at the receiver from different reflecting planes (e.g., different buildings). As such, the receiver may use the dominant reflection for subsequent velocity calculations. Dominant may indicate that a particular signal (or reflection of a signal) is received at a greater strength or the receiver is able to use the signal more easily or for more accurate measurements than a dominated signal (e.g., another reflection of the same signal).

In some examples, the receiver may determine that a second satellite transmitted a second positioning signal received at the receiver. In particular, the second satellite may be a NLOS satellite. As such, the receiver may discard the second positioning signal when determining the receiver's velocity based on determining the second satellite transmitted the second positioning signal. Particularly, the receiver may discard the second signal if the receiver has enough signals from other satellites available.

At block 506, method 500 involves, based on identifying the particular positioning signal, determining a reflected satellite position for a satellite that transmitted the particular positioning signal. The receiver may determine the reflected satellite position by reflecting a position of the satellite about the reflecting plane. In some instances, the receiver may detect the reflecting plane using a predefined map of the reflecting planes in the area (e.g., a 3D city map or topography map).

At block 508, method 500 involves determining a direction vector to the reflected satellite position for the satellite. For example, the direction vector may extend from the receiver towards the reflected satellite position.

At block 510, method 500 involves determining, at the receiver using the direction vector to the reflected satellite, a velocity of the receiver. For example, the receiver may perform a velocity matrix equation (e.g., equation 12) to determine the velocity of the receiver. The velocity matrix equation may use the direction vector to the reflected satellite position.

In some examples, the receiver may determine expected Doppler values using a receiver velocity dot-product the direction vector to the reflected satellite position. In particular, determining the expected Doppler values may indicate a velocity of the receiver.

Some examples may further involve determining a location of the receiver using the set of positioning signals from the satellites. As such, identifying the particular positioning signal that reflected off the reflecting plane prior to reaching the receiver may involve using a predefined map of reflecting planes based on the location of the receiver. The receiver may obtain the predefined map from a map database, another computing device, or may have the predefined map in storage.

Further examples may involve determining a position of the satellite that transmitted the particular positioning signal based on information in the particular positioning signal and determining that the satellite corresponds to a Non-Line-of-Sight (NLOS) satellite based on determining the position of the satellite. As such, the receiver may estimate a position of the reflecting plane using the position of the satellite and the predefined map of reflecting planes based on determining that the satellite corresponds to the NLOS satellite.

In a further implementation, a receiver may identify that a signal corresponds to a reflected signal based on a combination of information. For instance, the receiver may use topography information for the general location of the receiver, the approximate location of the receiver, and the location of the satellite, to identify one or more received signals that likely correspond to reflected signals.

The receiver may use the position and heights of buildings and/or other features in the general location to assist in identifying signals that may be reflected signals. For example, the receiver may use general area's topography information and position of the receiver and satellite to identifying any signals that likely have a direct path that is blocked, and therefore these signals must have been reflected off one or more features prior to reaching the receiver.

In some examples, the receiver may determine that the particular positioning signal reflected off a first reflecting plane and a second reflecting plane prior to reaching the receiver (e.g., multiple reflections prior to reaching the receiver). As such, based on determining that the particular positioning signal reflected off the first reflecting plane and the second reflecting plane prior to reaching the receiver, the receiver may determine a first reflected satellite position for the satellite that transmitted the particular positioning signal. The first reflected satellite position may be determined by reflecting the position of the satellite about the first reflecting plane. The receiver may further determine a second reflected satellite position for the satellite. In particular, the second reflected satellite position may be determined by reflecting the first reflected satellite position about the second reflecting plane. The receiver may then determine a particular direction vector to the second reflected satellite position and determine the velocity of the receiver using the particular direction vector to the second reflected satellite position.

In some examples, a receiver may use signals on multiple frequencies from a satellite to determine velocity. For instance, the receiver may track signals transmitted by the satellite on a first frequency and also track signals transmitted by the satellite on a second frequency. As such, the receiver may be configured to not mix up the signals when removing one from a set of signals used for velocity determination. The receiver may continue to use signals from both frequencies or select signals received at a particular frequency when performing velocity determination.

Figure 6A:
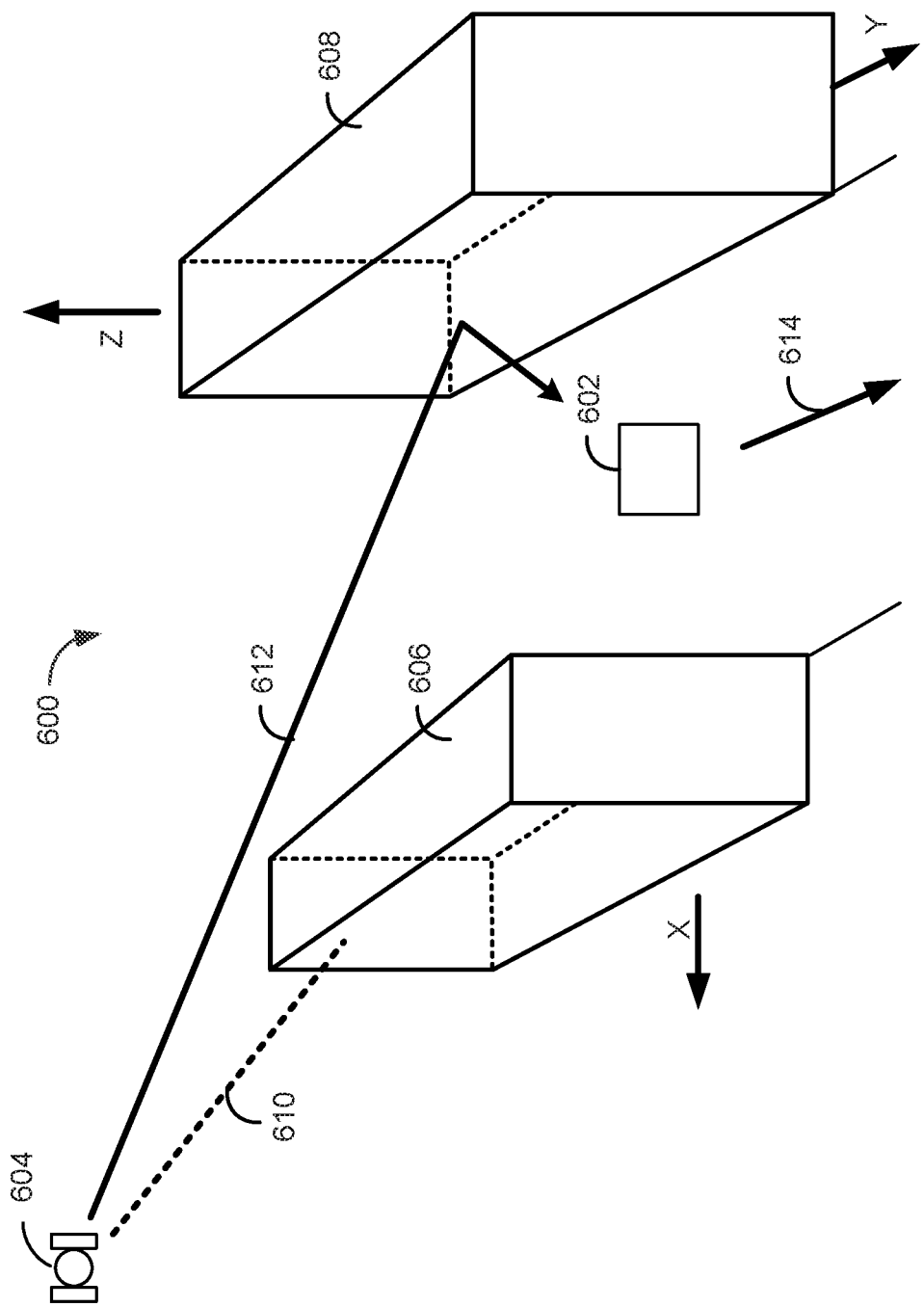
FIG. 6A illustrates a receiver receiving a reflection of a signal for velocity determination, in accordance with example embodiments.
Figure 6B:
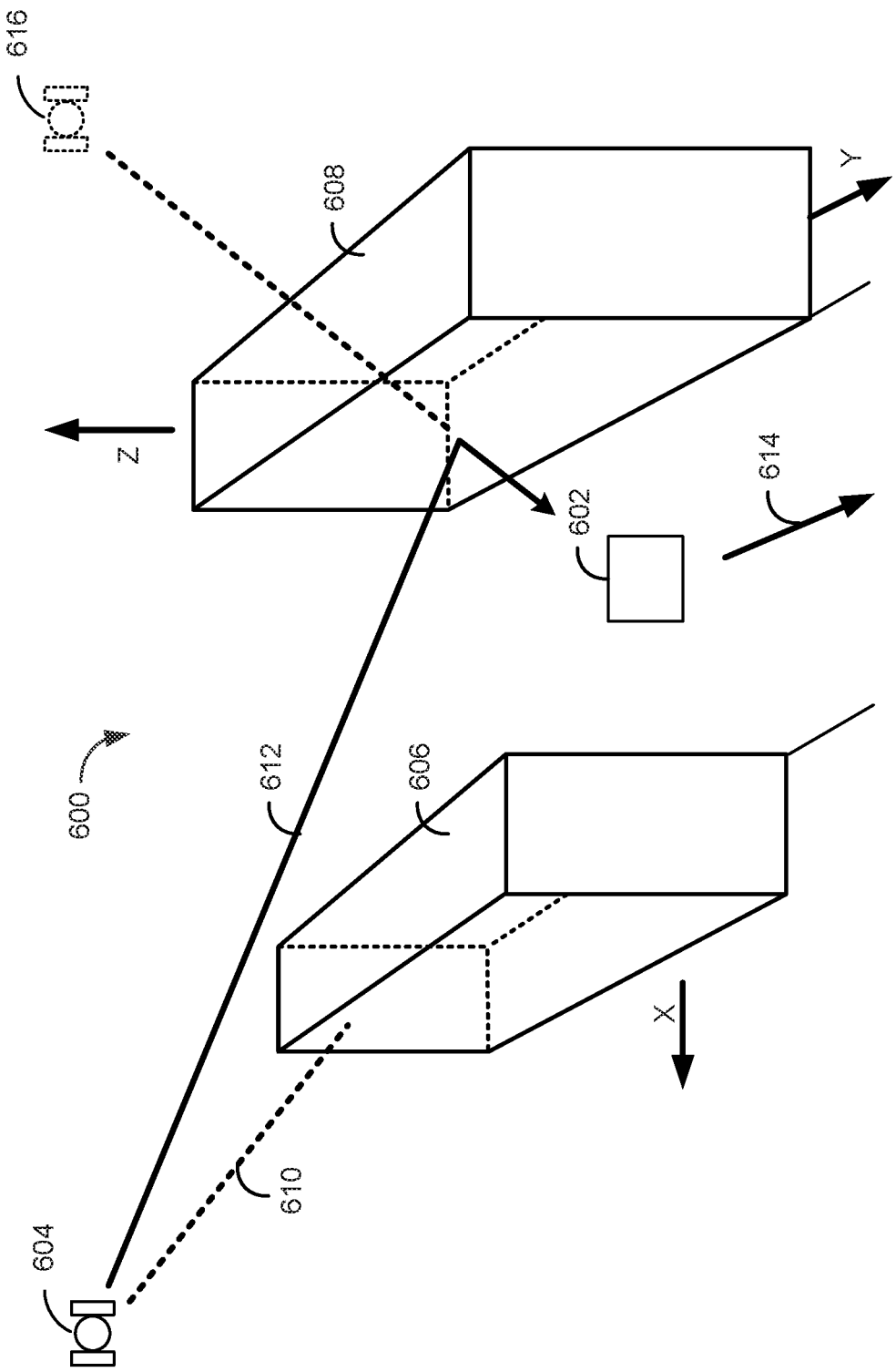
FIG. 6B illustrates the receiver determining velocity using the reflection of the signal, in accordance with example embodiments.

FIGS. 6A and 6B illustrate a scenario 600 showing receiver 602 determining its velocity using a reflected signal, in accordance with example embodiments. Scenario 600 is illustrated to represent a situation involving a receiver failing to receive a signal directly from a transmitting satellite when estimating its velocity. For example, scenario 600 may occur when receiver 602 corresponds to a navigational system for a vehicle traveling within a city with large buildings. The large buildings may block or otherwise interfere with the reception of signals from satellite 604.

FIG. 6A illustrates receiver 602 receiving a reflection of signal 612 from satellite 604, in accordance with example embodiments. In some situations, such as during navigation within a city, a receiver may encounter buildings and other obstacles that may impact the receiver's performance. In particular, buildings may interfere with the receiver's ability to receive signals from satellites directly. In these situations, the receiver may receive one or more signals in the form of a reflection. A reflection is a signal that arrives at the receiver after reflecting off one or more obstacles (e.g., one or more buildings) prior to reaching the receiver.

Scenario 600 shows an example situation where receiver 602 may receive a reflection due to its position relative to obstacles (e.g., buildings 606, 608) and the position of satellite 604 relative to receiver 602. In particular, receiver 602 is shown receiving a reflection of signal 612 after signal 612 bounces off building 608. Receiver 602 is further shown unable to receive signal 610 due to building 606 blocking the direct path between receiver 602 and satellite 604. As such, if receiver 602 uses the reflection of signal 612 to calculate velocity 614 without modifying calculations to accommodate the use of the reflection, the velocity results might be inaccurate.

FIG. 6B illustrates receiver 602 calculating its velocity using the reflection of signal 612 from satellite 604, in accordance with example embodiments. Receiver 602 is shown moving at velocity 614 between buildings 606 and 608.

When processing signals from satellites, receiver 602 (or associated computing device) may perform coherent integration, which involves multiplying signal 602 by a local copy of the spreading code that, ideally, maintains phase coherency with the received signal. If the Doppler of the received signal changes, then the Doppler of the local copy of the spreading code should be modified to maintain phase coherency, in particular when performing long coherent integration (i.e. coherent integration over tens or hundreds of milliseconds, or longer). Doppler changes may occur when velocity 614 of receiver 602 changes such that a new Doppler value may be computed from the receiver's new velocity dot-product with the unit vector towards the satellite as shown above. Computing the new Doppler value to maintain phase coherency is also known as "tight coupling," "ultra-tight coupling," and "S-GPS".

To calculate velocity 614, receiver 602 may use the reflection of signal 612 by adjusting calculations. In particular, the reflection of signal 612 appears to be arriving from a direction behind building 608 rather than the current position of satellite 604. Thus, to adjust velocity calculations to use the reflection of signal 612, receiver 602 may be configured to identify building 608 as the reflecting plane and reflect the position of satellite 604 about building 608 to estimate reflected satellite position 616. As shown in FIG. 6B, reflected satellite position 616 is located such that the reflection of signal 612 appears to be arriving from the same direction of reflected satellite 616.

To estimate reflected satellite position 616 for satellite 604, receiver 602 may logically place a coordinate system (X,Y,Z) through the reflecting plane. Thus, if the current position of satellite 604 is located at coordinates (x, y, z), receiver 602 (or an associated processor) may estimate reflected satellite position 616 for satellite 604 to be located at coordinates (−x, y, z). Receiver 602 may then use reflected satellite position 616 to determine a direction vector that extends from receiver 602 towards reflected satellite position 616 to associate with satellite 604 when determining the velocity of receiver 602. By using the matrix shown in equation 12, receiver 602 may use the determined direction vector from receiver 602 towards reflected satellite position 616 (instead of to satellite position 604) to obtain an accurate velocity.

Figure 7:
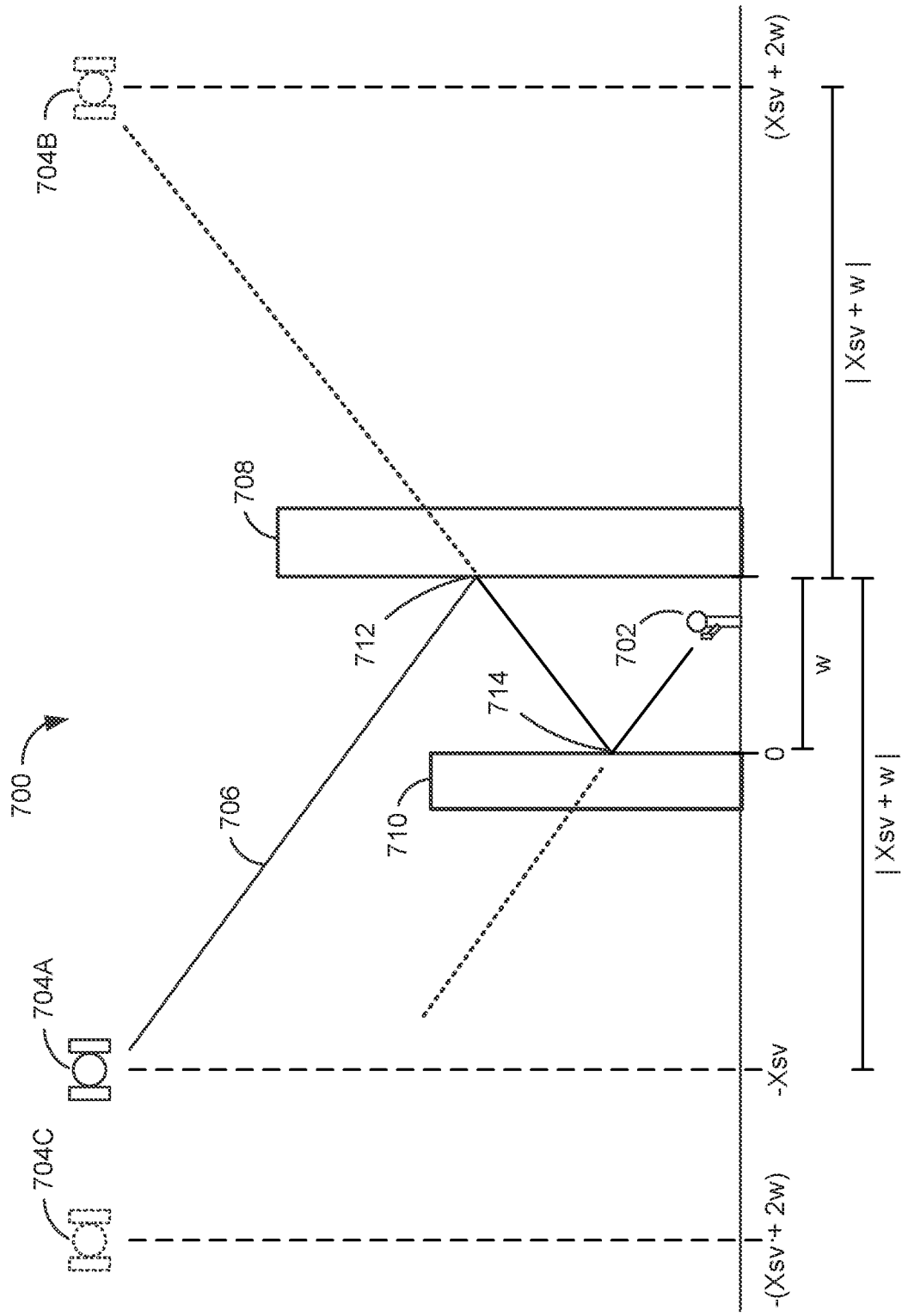
FIG. 7 illustrates a receiver using a signal that reflected off multiple buildings to determine velocity, in accordance with example embodiments.

FIG. 7 illustrates a receiver using a signal that reflected off multiple buildings to determine velocity, in accordance with example embodiments. As shown in scenario 700, receiver 702 may receive a reflection of signal 702 transmitted by satellite 704A. The reflection may arrive at receiver 702 after first reflecting off building 708 and subsequently reflecting off building 710 towards receiver 702. As such, scenario 700 is included to illustrate an example situation where a receiver may use a signal for velocity calculations after the signal reflected off multiple features prior to reaching the receiver.

In some embodiments, receiver 702 may be configured to determine initially whether there are other NLOS signals from satellite 704A converging on receiver 702. In response to determining that the reflection of signal 706 is the only signal received (or at least the strongest signal received), receiver 702 may reflect the position of satellite 704A about each reflecting plane until ending with the final reflecting plane before the reflection reached receiver 702. In particular, receiver 702 may first reflect position of satellite 704A about reflecting plane 712 on building 708 to determine reflected satellite position 704B. Receiver 702 may subsequently reflect position of first reflected satellite position 704B about reflecting plane 714 on building 710 to determine second reflected satellite position 704C. As a result, receiver 702 may use a unit vector extending from receiver 702 towards second reflected satellite position 704C within the H matrix of equation 12 for accurate velocity calculations. In a similar way, three or more reflections of a signal may be incorporated by reflecting the satellite position about each successive reflecting plane in turn, ending with the final reflecting plane before the signal reaches receiver 702.

In addition, estimated distances to the different satellite positions with respect to receiver 702 are shown in FIG. 7. Particularly, given that satellite 704A is at position "−Xsv" and the distance between the reflecting planes (e.g., buildings 708, 710) is "w", first reflected satellite position 704B is at position "Xsv+2w" and second reflected position 704C is at position "−(Xsv+2w)".

In further examples, a signal may reflect off additional surfaces prior to reaching receiver 702. For instance, the signal may reflect off three times prior to reaching receiver 702. As such, receiver 702 or an associated computing device may perform the process above and reflect a position of the satellite three times in order to use the final reflected satellite position for velocity calculations.

Figure 8:
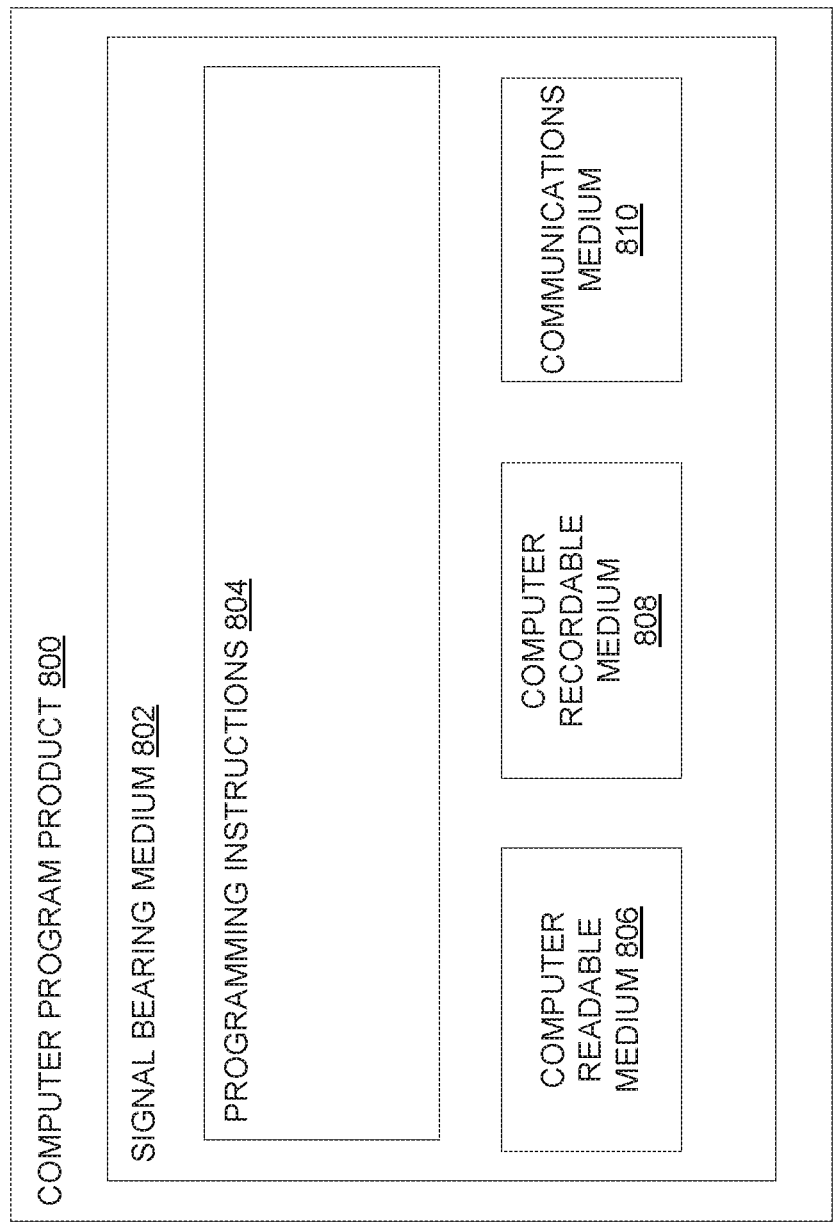
FIG. 8 is a schematic illustrating a conceptual partial view of an example computer program product that includes a computer program for executing a computer process on an example device.

FIG. 8 is a schematic illustrating a conceptual partial view of an example computer program product that includes a computer program for executing a computer process on a computing device, arranged according to at least some embodiments presented herein, one embodiment, computer program product 800 is provided using signal bearing medium 802.

Signal bearing medium 802 may include one or more programming instructions 804 that, when executed by one or more processors may provide functionality or portions of the functionality described above with respect to FIGS. 1-7. In some examples, signal bearing medium 802 may encompass computer-readable medium 806, such as, but not limited to, a hard disk drive, a Compact Disc (CD), a Digital Video Disk (DVD), a digital tape, memory, etc.

In some implementations, signal bearing medium 802 may encompass a computer recordable medium 808, such as, but not limited to, memory, read/write (R/W) CDs, R/W DVDs, etc. Signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, signal bearing medium 802 may be conveyed by a wireless form of communications medium 810.

Programming instructions 804 may be, for example, computer executable and/or logic implemented instructions. In some examples, a computing device such as processor 102 of FIG. 1 may be configured to provide various operations, functions, or actions in response to the programming instructions 804 conveyed to processor 102 by one or more of computer readable medium 806, computer recordable medium 808, and/or the communications medium 810.

The non-transitory computer readable medium could also be distributed among multiple data storage elements, which could be remotely located from each other. The computing device that executes some or all of the stored instructions could be a device, such as computing system 100 illustrated in FIG. 1 or receiver 202 illustrated in FIG. 2. Alternatively, the computing device that executes some or all of the stored instructions could be another computing device, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

What is claimed is:

1. A method comprising:
   receiving, at a receiver, a set of positioning signals from a plurality of satellites;
   identifying, from the set of positioning signals, a particular positioning signal that reflected off a first reflecting plane prior to reaching the receiver and a second positioning signal that reflected off a second reflecting plane prior to reaching the receiver;
   based on identifying the particular positioning signal and the second positioning signal, performing short coherent integration and a search over a combination of the particular positioning signal and the second positioning signal to differentiate between a signal strength of the particular positioning signal and a signal strength of the second positioning signal, wherein the receiver is configured to perform long coherent integration for signals received directly from a satellite, and wherein a duration of short coherent integration is less than a duration of long coherent integration;
   based on both the performance of short coherent integration and the search over the combination indicating the particular positioning signal is dominant over the second positioning signal, determining a reflected satellite position for a satellite that transmitted the particular positioning signal, wherein the reflected satellite position is determined by reflecting a position of the satellite about the first reflecting plane;
   determining a direction vector to the reflected satellite position for the satellite; and
   determining, at the receiver using the direction vector to the reflected satellite position, a velocity of the receiver.

2. The method of claim 1, wherein the receiver is a Global Navigation Satellite System (GNSS) receiver.

3. The method of claim 1, further comprising:
   determining a location of the receiver using the set of positioning signals from the plurality of satellites; and
   wherein identifying, from the set of positioning signals, the particular positioning signal that reflected off the first reflecting plane prior to reaching the receiver and the second positioning signal that reflected off the second reflecting plane prior to reaching the receiver comprises:
   identifying the particular positioning signal and the second positioning signal using a predefined map of reflecting planes based on the location of the receiver.

4. The method of claim 3, further comprising:
   determining a position of the satellite that transmitted the particular positioning signal based on information in the particular positioning signal; and
   based on determining the position of the satellite, determining that the satellite corresponds to a Non-Line-of-Sight (NLOS) satellite,
   based on determining that the satellite corresponds to the NLOS satellite, estimating a position of the first reflecting plane using the position of the satellite and the predefined map of reflecting planes.

5. The method of claim 1, further comprising:
   discarding the second positioning signal when determining the velocity of the receiver.

6. The method of claim 5, wherein identifying the second positioning signal that reflected off the second reflecting plane prior to reaching the receiver comprises:
   determining that the satellite that transmitted the particular positioning signal also transmitted the second positioning signal.

7. The method of claim 5, wherein identifying the second positioning signal that reflected off the second reflecting plane prior to reaching the receiver comprises:
   determining that a second satellite transmitted the second positioning signal, wherein the second satellite is a Non-Line-of-Sight (NLOS) satellite; and
   wherein discarding the second positioning signal when determining the velocity of the receiver is further based on determining that the second satellite transmitted the second positioning signal.

8. The method of claim 1, wherein determining, at the receiver using the direction vector to the reflected satellite position, the velocity of the receiver comprises:
performing a velocity matrix equation to determine the velocity of the receiver, wherein the velocity matrix equation uses the direction vector to the reflected satellite position.

9. The method of claim 1, wherein identifying, from the set of positioning signals, the particular positioning signal that reflected off the first reflecting plane prior to reaching the receiver further comprises:
determining that the particular positioning signal reflected off the first reflecting plane and an additional reflecting plane prior to reaching the receiver;
based on determining that the particular positioning signal reflected off the first reflecting plane and the additional reflecting plane prior to reaching the receiver, determining a first reflected satellite position for the satellite that transmitted the particular positioning signal, wherein the first reflected satellite position is determined by reflecting the position of the satellite about the first reflecting plane; and
based on determining the first reflected satellite position for the satellite, determining a second reflected satellite position for the satellite, wherein the second reflected satellite position is determined by reflecting the first reflected satellite position about the additional reflecting plane.

10. The method of claim 9, wherein determining the direction vector to the reflected satellite position for the satellite comprises:
determining a particular direction vector to the second reflected satellite position; and
wherein determining, at the receiver using the direction vector to the reflected satellite position, the velocity of the receiver comprises:
determining the velocity of the receiver using the particular direction vector to the second reflected satellite position.

11. The method of claim 1, further comprising:
responsive to receiving the set of positioning signals from the plurality of satellites, detecting a Doppler shift; and
responsive to detecting the Doppler shift, identifying, from the set of positioning signals, the particular positioning signal that reflected off the first reflecting plane prior to reaching the receiver.

12. The method of claim 1, wherein determining, at the receiver using the direction vector to the reflected satellite position, the velocity of the receiver comprises:
determining expected Doppler values using a receiver velocity dot-product the direction vector to the reflected satellite position, wherein determining the expected Doppler values indicates the velocity of the receiver.

13. The method of claim 1, further comprising:
determining a location of the receiver using the set of positioning signals from the plurality of satellites;
obtaining a predefined map of reflecting planes for the location of the receiver; and
identifying, from the set of positioning signals, one or more positioning signals that originate from Line-of-Sight (LOS) satellites and one or more positioning signals that originate from Non-Line-of-Sight (NLOS) satellites based on the predefined map of reflecting planes and information within each positioning signal.

14. A system comprising:
a receiver;
one or more processors configured to:
obtain, at the receiver, a set of positioning signals from a plurality of satellites;
identify, from the set of positioning signals, a particular positioning signal that reflected off a first reflecting plane prior to reaching the receiver and a second positioning signal that reflected off a second reflecting plane prior to reaching the receiver;
based on identifying the particular positioning signal and the second positioning signal, perform short coherent integration and a search over a combination of the particular positioning signal and the second positioning signal to differentiate between a signal strength of the particular positioning signal and a signal strength of the second positioning signal, wherein the receiver is configured to perform long coherent integration for signals received directly from a satellite, and wherein a duration of short coherent integration is less than a duration of long coherent integration;
based on both the performance of short coherent integration and the search over the combination indicating the particular positioning signal is dominant over the second positioning signal, determining a reflected satellite position for a satellite that transmitted the particular positioning signal, wherein the reflected satellite position is determined by reflecting a position of the satellite about the first reflecting plane;
determine a direction vector to the reflected satellite position for the satellite; and
determine, using the direction vector to the reflected satellite position, a velocity of the receiver.

15. The system of claim 14, wherein the one or more processors are further configured to:
determine a location of the receiver using the set of positioning signals from the plurality of satellites; and
wherein identifying, from the set of positioning signals, the particular positioning signal that reflected off the first reflecting plane prior to reaching the receiver and the second positioning signal that reflected off the second reflecting plane prior to reaching the receiver comprises:
identifying the particular positioning signal and the second positioning signal using a predefined map of reflecting planes based on the location of the receiver.

16. The system of claim 14, wherein the one or more processors are further configured to:
based on the performance of short coherent integration indicating the particular positioning signal is dominant over the second positioning signal, discard the second positioning signal when determining the velocity of the receiver.

17. The system of claim 16, wherein the one or more processors are further configured to:
determine that the satellite that transmitted the particular positioning signal also transmitted the second positioning signal.

18. The system of claim 16, wherein identifying the second positioning signal that reflected off the second reflecting plane prior to reaching the receiver comprises:
determining that a second satellite transmitted the second positioning signal, wherein the second satellite is a Non-Line-of-Sight (NLOS) satellite; and
wherein discarding the second positioning signal when determining the velocity of the receiver is further based on determining that the second satellite transmitted the second positioning signal.

19. The system of claim 14, wherein the one or more processors are further configured to:
- determine a location of the receiver using the set of positioning signals from the plurality of satellites;
- obtain a predefined map of reflecting planes for the location of the receiver; and
- identify, from the set of positioning signals, one or more positioning signals that originate from Line-of-Sight (LOS) satellites and one or more positioning signals that originate from Non-Line-of-Sight (NLOS) satellites based on the predefined map of reflecting planes and information within each positioning signal.

20. A non-transitory computer-readable medium configured to store instructions, that when executed by a computing system comprising one or more processors, causes the computing system to perform functions comprising:
- receiving, at a receiver, a set of positioning signals from a plurality of satellites;
- identifying, from the set of positioning signals, a particular positioning signal that reflected off a first reflecting plane prior to reaching the receiver and a second positioning signal that reflected off a second reflecting plane prior to reaching the receiver;
- based on identifying the particular positioning signal and the second positioning signal, performing short coherent integration and a search over a combination of the particular positioning signal and the second positioning signal to differentiate between a signal strength of the particular positioning signal and a signal strength of the second positioning signal, wherein the receiver is configured to perform long coherent integration for signals received directly from a satellite, and wherein a duration of short coherent integration is less than a duration of long coherent integration;
- based on both the comparison and the search over the combination indicating the particular positioning signal is dominant over the second positioning signal, determining a reflected satellite position for a satellite that transmitted the particular positioning signal, wherein the reflected satellite position is determined by reflecting a position of the satellite about the first reflecting plane;
- determining a direction vector to the reflected satellite position for the satellite; and
- determining, using the direction vector to the reflected satellite position, a velocity of the receiver.

\* \* \* \* \*